United States Patent
Kaneko et al.

(10) Patent No.: US 6,723,423 B1
(45) Date of Patent: Apr. 20, 2004

(54) TRANSPARENT SHEET OR FILM

(75) Inventors: Shoichi Kaneko, Saitama (JP); Hiroshi Sakurai, Saitama (JP); Takeshi Takahashi, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/601,814

(22) PCT Filed: Feb. 16, 1999

(86) PCT No.: PCT/JP99/00656

§ 371 (c)(1),
(2), (4) Date: Aug. 8, 2000

(87) PCT Pub. No.: WO99/41066

PCT Pub. Date: Aug. 19, 1999

(30) Foreign Application Priority Data

| Feb. 17, 1998 | (JP) | ............................................... 10-50040 |
| Jun. 2, 1998 | (JP) | ........................................... 10-152366 |
| Oct. 21, 1998 | (JP) | ........................................... 10-299706 |
| Dec. 16, 1998 | (JP) | ........................................... 10-357109 |

(51) Int. Cl.⁷ ........................... B32B 5/16; B32B 27/00; B32B 27/08

(52) U.S. Cl. ....................... 428/323; 428/328; 428/500; 428/515

(58) Field of Search ................................ 428/323, 328, 428/332, 339, 411.1, 500, 688, 689; 106/286.1, 286.6, 400, 419

(56) References Cited

U.S. PATENT DOCUMENTS 5,252,356 A  * 10/1993  Yoshida et al. ........ 427/126.23
6,107,360 A    8/2000  Kaneko et al. ................ 522/81

FOREIGN PATENT DOCUMENTS

| JP | 09108621 | 4/1997 |
| JP | 09151203 | 6/1997 |
| JP | 09227834 | 9/1997 |
| JP | 09310031 | 12/1997 |
| JP | 10036415 | 2/1998 |
| JP | 10194780 | 7/1998 |
| JP | 10206603 | 8/1998 |
| JP | 10231444 | 9/1998 |
| JP | 10235807 | 9/1998 |
| JP | 10244618 | 9/1998 |
| JP | 10259328 | 9/1998 |
| JP | 10300902 | 11/1998 |
| JP | 11049965 | 2/1999 |
| WO | WO97/11975 | * 4/1997 |

* cited by examiner

Primary Examiner—Paul Thibodeau
Assistant Examiner—Sheeba Ahmed
(74) Attorney, Agent, or Firm—Nields & Lemack

(57) ABSTRACT

The present invention is relating to a transparent sheet or film which is good in productivity, high in transparency, excellent in antistatic property and reflection preventing property, high in hardness, and excellent in scratch resistance and solvent resistance.

A transparent sheet or film of the present invention is a sheet or film having on one surface of a transparent support, a first electroconductive transparent layer comprising a cured layer of a resin containing fine particles of electroconductive zinc antimonate anhydride, and a second electroconductive transparent layer formed on the first layer, of which a refractive index is lower than that of the first layer.

16 Claims, No Drawings

TRANSPARENT SHEET OR FILM

This application is a national stage filing under 35 USC 371 from PCT/JP99/00656, filed Feb. 16, 1999.

TECHNICAL FIELD

The present invention relates to a transparent sheet or film excellent in reflection reducing ability and having high electric conductivity and an excellent antistatic property, which is used as a surface of polarizing plate used in various display devices including a liquid crystal display device, such as a word processor, a computer, a television set, a plasma display panel (PDP),and a surface of a transparent plastic material, sunglasses, a cover for various meters, window glass for an automobile and an electric train, and the like.

BACKGROUND ART

A transparent substrate, such as glass and plastics, is used as a corner mirror, a rear-view mirror, goggle, window glass, a personal computer, a word processor, a PDP, an LCD (liquid crystal display), various commercial designs, and the like. When we observe the objects such as letters and graphics through the transparent substrate, there is a problem that we cannot notice the substances clearly because of reflection on the surface of the transparent subjects. As a method for preventing the light reflection on the transparent substrate, there is a conventional method, in which a about 0.1 $\mu$m thick thin film of $MgF_2$, $SiO_2$ and the like is formed on the surface of glass or plastics by a gas phase method, such as a plasma CVD (chemical vapor deposition) method and the like. In order to impart the antistatic property, it is necessary that a metallic film having high transparency, such as ITO, ATO and the like, is formed in the similar manner.

However, the method of forming the about 0.1 $\mu$m thick thin film of $MgF_2$, $SiO_2$ and the like on the transparent substrate, such as surface of glass, a plastic substrate and the like has disadvantages that a complicated process and a large-scale apparatus are required, and the productivity is poor to increase the cost thereof.

The object of the invention is to provide an inexpensive transparent sheet or film having an antistatic property and a reflection reduction property having good productivity.

DISCLOSURE OF THE INVENTION

The invention relates to:

(1) A transparent sheet or film having on one surface of a transparent support, a first electroconductive transparent layer comprising a cured layer of a resin containing fine particles of electroconductive zinc antimonate anhydride, and a second electroconductive transparent layer formed on the first layer, of which a refractive index is lower than that of the first layer;

(2) A transparent sheet or film as described in item (1), wherein the first electroconductive transparent layer contains a dispersant;

(3) A transparent sheet or film as described in item (1) or (2), wherein the above mentioned fine particles are zinc antimonate anhydride having a primary particle diameter of 0.5 micron or less, and the resin is an ultraviolet ray-curable (meth)acrylate having two or more (meth) acryloyl groups in a molecule thereof;

(4) A transparent sheet or film as described in item (1) or (2), wherein the above mentioned fine particles are zinc antimonate having a particle diameter, by a BET method, of 18 nm or less and an average particle diameter, by a dynamic light scattering method, of 100 nm or less, and of which resin comprises an ultraviolet ray-curable (meth)acrylate having two or more (meth) acryloyl groups in a molecule thereof;

(5) A transparent sheet or film as described in any one of items (1) to (4), wherein a content ratio of the electroconductive zinc antimonate anhydride is from 50 to 90% by weight;

(6) A transparent sheet or film as described in any one of items (1) to (5), wherein the first electroconductive transparent layer has a refractive index (25° C.) of 1.55 or higher;

(7) A transparent sheet or film as described in any one of items (1) to (6), wherein the second layer has a refractive index of 1.48 or less;

(8) A transparent sheet or film as described in any one of items (1) to (7), wherein the second layer contains a surface active agent;

(9) A transparent sheet or film as described in any one of items (1) to (8), wherein the second has a thickness of 1 $\mu$m or less;

(10) A transparent sheet or film as described in any one of items (1) to (9), which has a hard coated layer comprising an ultraviolet ray-curable (meth) acrylate resin having two or more (meth)acryloyl groups in a molecule thereof, between the transparent support and the first layer;

(11) A transparent sheet or film as described in any one of items (1) to (10), which has a transparent layer comprising an ultraviolet ray-curable transparent hard coating agent and having a refractive index higher than that of the first layer between the first layer and the second layer;

(12) A transparent sheet or film as described in item (11), wherein the ultraviolet ray-curable transparent hard coating agent of a high refractive index comprises an ultraviolet ray-curable binder containing an ultraviolet ray-curable resin having two or more (meth)acryloyl groups in a molecule thereof, and fine particles of a high refractive index comprising a metal or a metallic oxide; and the transparent layer comprising the transparent hard coating agent has a refractive index of 1.55 or higher;

(13) A transparent sheet or film as described in item (11), wherein the fine particles of a high refractive index are zirconium oxide, titanium oxide, cerium oxide, zinc oxide, indium oxide or a three-component sol of titanium oxide, zirconium oxide and tin oxide, and have an average particle diameter of 0.5 $\mu$m or less;

(14) A transparent sheet or film as described in any one of items (10) to (13), characterized that the transparent sheet or film has fine unevenness on the surface , facing the first layer, of the hard coated layer formed between the transparent support and the first layer, and the hard coated layer being made from the ultraviolet ray-curable (meth)acrylate resin, or on the surface, facing the second layer, of the transparent layer having high refractive index of the ultraviolet ray-curable transparent hard coat agent;

(15) A transparent sheet or film as described in any one of items (1) to (14), which has an adhesive agent layer on the other surface of the transparent support;

(16) A transparent sheet or film as described in item (15), wherein the adhesive agent is colored by a coloring agent;

(17) A transparent sheet or film as described in item (16), wherein the coloring agent is a pigment;

(18) A transparent sheet or film which comprises having, on one surface of the transparent support, a hard coating layer of an ultraviolet ray-curable (meth) acrylate resin having two or more (meth)acryloyl groups in a molecule thereof, and a first electroconductive transparent layer which comprises a cured layer of a resin containing fine particles of electroconductive zinc antimonate anhydride being formed thereon, and a second electroconductive transparent layer being formed on the first electroconductive transparent layer of which refractive index is lower than that of the first layer, wherein the fine particles of zinc antimonate are zinc antimonate having a particle diameter, by a BET method, of 18 nm or less and an average particle diameter, by a dynamic light scattering method, of 100 nm or less and wherein said resin of the second layer comprises an ultraviolet ray-curable (meth)acrylate having two or more (meth)acryloyl groups in a molecule thereof and a content ratio of the electroconductive zinc antimonate anhydride is from 50 to 90% by weight and of which haze is 1.5 or less and a reflectivity is 2% or less;

(19) A display device on which a transparent sheet or film as described in any one of items (1) to (18) is attached;

(20) An electroconductive transparent hard coat agent comprising a sol of electroconductive zinc antimonate anhydride having a particle diameter, by a BET method, of 18 nm or less and an average particle diameter, by a dynamic light scattering method, of 100 nm or less, and a dispersant;

(21) An electroconductive transparent hard coating agent as described in item (20), which contains an ultraviolet ray-curable resin; and

(22) An electroconductive transparent hard coating agent as described in item (20) or (21), wherein a content ratio of the electroconductive zinc antimonate anhydride is from 50 to 90% by weight of a non-volatile component.

BEST MODE FOR CARRYING OUT THE INVENTION

The transparent sheet or film of the invention has, on one surface of a transparent support, a first electroconductive transparent layer comprising a cured film of a resin containing fine particles of electroconductive zinc antimonate anhydride and a second transparent layer formed thereon having a refractive index lower than that of the first layer. The surface reflectivity (reflectivity at 550 nm) is desirably 4% or less, and preferably 2% or less. The numerical values of the reflectivity herein are not so strict but are rough standard. The transparent sheet or film of the invention preferably has a total luminous transmittance of 80% or more under the condition where an adhesive agent layer is not present. The total luminous transmittance herein is a value measured by a method defined in JIS K7105 (1981).

The support used in the invention is not particularly limited as far as it is in the form of a transparent sheet or film, and examples thereof include those made of glass and those made of plastics. Examples of the plastics include polyethylene, polyethylene terephthalate, polypropylene, polystyrene, an acrylic resin and the like.

The terms sheet or film in the invention are not for strictly distinguishing a sheet and a film, but is used for clarifying that it encompasses both of them. The sheet or film can be interpreted widely to the fullest extent as far as it has the characteristic features of the invention, and the sheet encompasses those called a plate or a board as far as they have the characteristic features of the invention. In the case where the sheet and the film are distinguished as in the Examples and the like, the sheet is generally used for those having a thickness of about from 0.5 to 5 mm, and the film is generally used for those having a thickness of from 10 to 500 $\mu$m. The transparent support may have a hard coating layer comprising an ultraviolet ray-curable (meth)acrylate resin having two or more (meth)acryloyl groups in a molecule thereof. The thickness of the hard coating layer is determined by the surface hardness required in the resulting transparent sheet or film, and is preferably from 3 to 20 $\mu$m. Examples of the ultraviolet ray-curable (meth)acrylate resin having two or more (meth)acryloyl groups in a molecule thereof include the ultraviolet ray-curable (meth)acrylate resins having two or more (meth)acryloyl groups in a molecule thereof used in the first layer described later.

The content of the fine particles of electroconductive zinc antimonate anhydride in the first electroconductive transparent layer is generally 30% by weight or more, and preferably 40% by weight or more, based on the total weight of the first layer, and in the case where higher electroconductivity is demanded, it may be 50% by weight or more, or 55% by weight or more. The upper limit is not particularly limited as far as the first layer can be formed with the resin contained, and is generally 90% by weight or less. There are cases where it is preferably 80% by weight or less, and further preferably 70% by weight or less, from the standpoint of the strength and the transparency of the first layer. The thickness of the first layer is generally about from 0.5 to 6 $\mu$m, and preferably about from 1 to 4 $\mu$m. The first electroconductive transparent layer is formed by coating, on one surface of the transparent support, an electroconductive coating agent (A) comprising fine particles of electroconductive zinc antimonate anhydride and a resin, followed by curing. In some cases, the electroconductive coating agent (A) may be coated on one surface of the transparent support through another layer. Particularly, in order to obtain the first layer of high refractive index, for example, a refractive index of 1.55 or more (25° C., hereinafter the same), the content of the fine particles of electroconductive zinc antimonate anhydride in the first electroconductive transparent layer is suitably from 50 to 90% by weight, and preferably from 55 to 90% by weight.

The zinc antimonate anhydride used in the invention is suitably those having a primary particle diameter of 0.5 $\mu$m or less. The process for producing the zinc antimonate anhydride is described, for example, in JP-A-6-219743, and the zinc salt can be available as an organosol of methanol (Celnax CX-Z600M-3, produced by Nissan Chemical Industries, Ltd.) or methanol/isopropanol (Celnax CX-Z300IM, Celnax CX-Z650M-3F and Celnax CX-Z600M-3F2, all produced by Nissan Chemical Industries, Ltd.). The zinc antimonate anhydride sols are said to have a primary particle of 0.5 $\mu$m or less, but preferably coarse particles are removed by passing a filter having an absolute pore diameter of 0.6 $\mu$m or less, so as to obtain a film of higher transparency in comparison to the case of that before passing the filter. The zinc antimonate sol is preferably a first-particle diameter, by a BET method, of 18 nm or less and an average particle diameter, by a dynamic light scattering method, of 100 nm or less. The zinc antimonate anhydride has a volume resistivity, for example, of from $1 \times 10^2$ to $1 \times 10^3$, but is not limited thereto. The particle diameter by a BET method is a particle diameter calculated by a gas phase adsorption method of the zinc antimonate in a powder form. The average particle diameter by a dynamic light scattering method is an average particle diameter obtained by measuring in the state of a zinc antimonate sol by an N4 apparatus produced by Coulter Inc. The content of the zinc antimonate is preferably from 50 to 90% by weight in the non-volatile component (components other than a solvent) of the hard coat agent (A).

While the sol of zinc antimonate anhydride is stable in methanol not to increase the particle diameter thereof by aggregation, in the case where it is used by mixing with an ultraviolet ray-curable resin or a solvent, such as toluene, MEK (methyl ethyl ketone), ethyl acetate and the like, it becomes unstable, whereby it increases the particle diameter thereof by aggregation, and the dispersion thereof is broken to occur separation and precipitation. In order to stably disperse the sol of zinc antimonate anhydride in the resin or the solvent, it is preferred to disperse it by using a dispersant. As the dispersant, a cationic dispersant, a weakly cationic dispersant, a nonionic dispersant and an amphoteric dispersant are effective. In particular, a surface active agent of an alkylamine series modified by a lower (C2 to C3) alkyleneoxide, such as propylene oxide, ethylene oxide and the like, e.g., Solsperse 20000 (a trade name, an PO, EO modified product of alkylamine, produced by Zeneca Agrochemicals, Co., Ltd.) and TAMNO-15 (a trade name, an EO modified product of alkylamine, produced by Nikko Chemicals Co., Ltd.), can be exemplified as preferred examples. The addition amount thereof is generally from 0.05 to 20% by weight, and preferably from 0.5 to 20% by weight, against the zinc antimonate anhydride. Examples of the alkyl group (which may have a double bond) of the alkylamine include an alkyl group having from 1 to 20 carbon atoms, such as a methyl group, an ethyl group, a lauryl group, a stearyl group, an oleyl group and the like. The addition mole number of EO (ethylene oxide) and /or PO (propylene oxide) is about from several mol to 100 mol per 1 mol of the amine, but is not limited thereto. In addition to the components described in the foregoing, a leveling agent and a defoaming agent may be added depending on necessity.

The resin in the first layer of the invention behaves as a binder, and for example, a thermosetting resin, an ultraviolet ray-curable resin and the like may be used as the resin. Taking the production efficiency, the cost and the scratch resistance into consideration, an ultraviolet ray-curable resin is more preferred. As the ultraviolet ray-curable resin herein, an ultraviolet ray-curable (meth)acrylate (used as meaning of acrylate and/or methacrylate, the similar expressions hereinafter having the similar meanings) is preferred, and examples thereof include an ultraviolet ray-curable polyfunctional acrylate having two or more (meth) acryloyl group in a molecule thereof. Examples of the ultraviolet ray-curable polyfunctional acrylate having two or more (meth) acryloyl group in a molecule thereof include a polyolpoly(meth)acrylate, such as neopentyl glycol di(meth)acrylate, 1,6-hexanediol di(meth)acrylate, trimethylolpropane tri(meth)acrylate, ditrimethylolpropane tetra(meth)acrylate, pentaerythritol tetra(meth)acrylate, pentaerythritol tri(meth)acrylate, dipentaerythritol hexa(meth)acrylate and the like, an epoxy (meth)acrylate, such as di(meth)acrylate of bisphenol A diglycidyl ether, di(meth)acrylate of neopentyl glycol diglycidyl ether, di(meth)acrylate of 1,6-hexanediol diglycidyl ether and the like, a polyester (meth)acrylate obtained by esterification of a polyvalent carboxylic acid and/or an anhydride thereof, and acrylic acid with a polyvalent alcohol, , a urethane acrylate obtained by reaction of a polyvalent alcohol, a polyvalent isocyanate and an acrylate containing a hydroxyl group, polysiloxane acrylate, and the like. The polymerizable acrylates may be used singly or as a mixture of two or more of them.

While the refractive index of the first layer is not particularly limited, since a film having a higher refractive index than the second layer is used, the refractive index is preferably higher than 1.5, and more preferably 1.55 or more.

The electroconductive coating agent (A) for forming the film of the first layer can be generally obtained by adding, depending on necessity, a dispersant, a resin solution or a polymerizable resin solution (which term is used as a meaning containing a polymerizable monomer liquid), a polymerization initiator, and a diluting agent, such as an organic solvent, for example, a lower alcohol, a lower alkyl ketone (for example, methyl ethyl ketone and the like), a lower organic acid ester (for example, ethyl acetate and the like), a benzene series solvent (toluene, xylene and the like) and the like, to an electroconductive substance dispersion formed by uniformly dispersing the electroconductive zinc antimonate anhydride in a solvent, such as water, a lower alcohol (for example, methanol, ethanol and the like), and the like, followed by sufficiently mixing.

While the composition of the electroconductive coating agent (A) is not particularly limited, the content of the electroconductive zinc antimonate anhydride is generally 30% by weight or more, preferably 40% by weight or more, more preferably 50% by weight or more, and further preferably 55% by weight or more, against the weight of the total solid content in the dispersion (the weight of the total components exept the solvent), and the upper limit thereof is generally 95% or less by weight, preferably 90% or less by weight, more preferably 80% or less by weight, and further preferably 70% or less by weight. The optimum range is about from 50 to 65% by weight. The content of the resin component (which term is used as a meaning containing a polymerizable resin component) is the reminder obtained by subtracting the content of the electroconductive substance from the total weight of the solid content in the dispersion. When the content of the zinc antimonate anhydride is 30% by weight, it is 70% by weight at most, and when the auxiliaries, such as the dispersant, the polymerization initiator and the like, are contained, it is the reminder obtained by further subtracting them. In the case where a dispersant is used, the content thereof is generally about from 0.5 to 15% by weight, preferably about from 1 to 10% by weight, and more preferably about from 2 to 6% by weight, against the total weight of the solid content in the dispersion. The polymerization initiator is generally about from 1 to 15% by weight, and preferably about from 2 to 10% by weight, against the total weight of the solid content in the dispersion. While the ratio of the solid content and the solvent can be determined by the factors of easiness of forming the film and the like, the solid content is generally about from 40 to 90% by weight, and preferably about from 50 to 80% by weight, against the total weight of the dispersion, and the balance is the solvent.

In the case where an ultraviolet ray-curable resin is used as the binder of the electroconductive coating agent (A) for the first layer, an ultraviolet ray-curable coating agent (B) obtained by mixing the other components is gradually added under stirring into a zinc antimonate sol to produce the objective resin composition for the first layer. Furthermore, it is possible that the dispersant is firstly added to a zinc antimonate sol, and then the ultraviolet ray-curable coating agent (B) containing the other components is added, so as to produce the composition.

The transparent second layer having a low refractive index is generally accumulated on the first layer through another layer depending on necessity. In order to reduce reflection, it is necessary that the second layer has a refractive index lower than the refractive index of the first layer. While the refractive index of the second layer is not particularly limited as far as it is lower than the refractive index of the first layer, it is generally 1.5 or less, and preferably about 1.48 or less. The lower limit of the refractive index is not particularly limited, and is generally about 1.28. The thickness thereof is preferably 1 $\mu$m or less, and particularly about 0.1 $\mu$m.

As the material for the second layer, while the thermosetting resin, the ultraviolet ray-curable resin and the like can be used as similar to the case of the first layer, resins having lower refractive indexes than the resin of the first layer are used, and a resin having a low refractive index (hereinafter referred to as a low refractive index resin) is preferred. For example, those providing a refractive index of a film of less than 1.5 can be exemplified, and more preferably those of about less than 1.48 can be exemplified. Examples of the resin having a low refractive index include an ultraviolet ray-curable resin, a thermosetting polysiloxane resin (such as KP-854 and KP 85 produced by Shin-Etsu Chemical Co., Ltd.) and a thermosetting fluorine-containing polysiloxane resin disclosed in JP-A-9-208898.

The thermosetting fluorine-containing polysiloxane resin disclosed in JP-A-9-208898 is generally obtained as a solution and is cured by heat at from 80 to 450° C.

The ultraviolet ray-curable resin having a low refractive index is used as a mixed resin of a general ultraviolet ray-curable resin and an ultraviolet ray-curable resin having a low refractive index, a monomer containing fluorine or a low refractive index thermoplastic polymer, or is used singly as the ultraviolet ray-curable resin having a low refractive index. In the case of the mixed resin, the ratio of the general ultraviolet ray-curable resin and the ultraviolet ray-curable resin having a low refractive index, the monomer containing fluorine or the low refractive index thermoplastic polymer is determined by considering the reflection preventing property, the scratching resistance, the solvent resistance and the like of the surface of the layer.

As the ultraviolet ray-curable resin having a low refractive index, a low refractive index acrylate, such as trifluoroacrylate (refractive index: 1.32) is preferably used. Furthermore, an ultraviolet ray-curable silicone series resin, such as X-12-2400 (a trade name, an ultraviolet ray-curable silicone series resin produced by Shin-Etsu Chemical Co., Ltd.), is preferred. Examples of the monomer containing fluorine include $CF_2=CF_2$, $CH_2=CF_2$, $CF_2=CHF$ and the like, and as the low refractive index thermoplastic polymer, a fluorine series polymer containing a fluorine atom is preferred since it has a low refractive index of 1.45 or less. Furthermore, those obtained by polymerizing the monomer containing fluorine and those obtained by making them into a block polymer can also be used. Specific examples of the polymer, the main chain of which has been subjected to fluorine modification, include PTFE (polytetrafluoroethylene), PVDF (polyvinylidene fluoride), PVF (polyvinyl fluoride) and the like.

The general ultraviolet ray-curable resin (generally providing a refractive index of a film of more than 1.5) used in combination with the resin having a low refractive index is mainly used for increasing the strength of the film, such as the scratch resistance, the solvent resistance and the like, and for example, a polyfunctional acrylate having two or more of unsaturated groups is preferred. While the addition amount of the polyfunctional acrylate is preferably small from the standpoint of the refractive index, it is preferably added, in order to improve the scratch resistance, in 5 parts or more, and more preferably 10 parts or more, per 100 parts by weight of the ultraviolet ray-curable resin having a low refractive index, and the upper limit thereof is generally about 60 parts by weight or less, and preferably about 40 parts or less, while depending on the species of the resin added.

Examples of the polyfunctional acrylate used in combination for improving the strength of the second layer include a polyol poly(meth)acrylate, such as neopentyl glycol di(meth)acrylate, 1,6-hexanediol di(meth)acrylate, trimethylolpropane tri(meth)acrylate, ditrimethylolpropane tetra(meth)acrylate, pentaerythritol tetra(meth)acrylate, pentaerythritol tri(meth)acrylate, dipentaerythritol hexa(meth)acrylate and the like, an epoxy (meth)acrylate, such as di(meth)acrylate of bisphenol A glycidyl ether, di(meth)acrylate of neopentyl glycol diglycidyl ether, di(meth)acrylate of 1,6-hexanediol diglycidyl ether and the like, a polyester (meth)acrylate obtained by esterification of a polyvalent carboxylic acid and/or an anhydride thereof, and acrylic acid with a polyvalent alcohol, , a urethane (meth)acrylate obtained by reaction of a polyvalent alcohol, a polyvalent isocyanate and an acrylate containing a hydroxyl group, polysiloxane (meth)acrylate, and the like.

In order to reduce the refractive index of the second layer, it is generally preferred to use ultrafine particles having a low refractive index. In the case where the ultrafine particles are used in combination, the content of the ultrafine particles in the second layer is generally about from 100 to 400 parts by weight, and preferably from 100 to 300, per 100 parts by weight of the resin (the total amount of the resin in the second layer). In the case where the general ultraviolet ray-curable resin is used in combination for improving the hardness, it is generally preferred to use the ultrafine particles having a low refractive index. The ultrafine particles are generally fine particles having a particle diameter of from 5 to 50 nm and a refractive index of 1.5 or less, preferably 1.45 or less. As the low refractive index fine particles, for example, ultrafine particles of LiF (refractive index: 1.4), $MgF_2$ (refractive index: 1.4), $3NaF.AlF_3$ (refractive index: 1.4), $AlF_3$ (refractive index: 1.4), $Na_3AlF_6$ (cryolite, refractive index: 1.33), $SiO_x$ (silica sol, 1.50 <x<2.0) (refractive index: 1.35 to 1.48) and the like are used, and silica sol is preferred.

In order to prevent stain on the surface, it is preferred to add a surface active agent (dispersant) having a stain preventing property to the second layer having a low refractive index. Examples of the surface active agent having a contamination preventing property include a silicone types surface active agent, a fluorine types surface active agent and the like. The addition amount thereof is about 0 to 10% by weight based on the total amount of the resin.

In the forming method of the second layer having a low refractive index, for example, a low refractive index coating agent for the second layer containing the resin having a low refractive index mentioned above, and depending on necessity, a resin for increasing the strength, a polymerization initiator, ultrafine particles having a low refractive index and so on, is diluted depending on necessity, and generally is coated directly on the first layer, or in the case where another layer intervenes, is coated on that layer, followed by heating in the case of the thermosetting resin, or followed by irradiating with an ultraviolet ray in the case of the ultraviolet ray-curable resin, so as to cure the coated film. The low refractive index coating agent can be obtained by dispersing or dissolving the respective components described in the foregoing in the proportions described in the foregoing depending on necessity in a suitable solvent. The content ratio of the solvent and the solid components except the solvent is not particularly limited as far as it is such a concentration that the coating agent can be coated, and in general, the content ratio of the solid components is about from 0.5 to 50% by weight, and preferably about from 0.5 to 20% by weight, based on the total weight of the coating agent.

The thickness of the second layer is preferably 2 $\mu$m or less, and more preferably 1 $\mu$m or less, and when it is formed as a thin film of about 0.1 $\mu$m, it is advantageous in the effect of reflection prevention.

In order to further improve the reflection prevention performance, a high refractive index layer having a refractive index higher than the refractive index of the first layer is preferably formed between the first layer and the second layer. The refractive index of the high refractive index layer is preferably 1.55 or more, more preferably 1.6 or more, and further preferably 1.65 or more. The upper limit is not particularly limited, and is about 2.7 by the current technology. The thickness of the high refractive index layer is determined by the surface hardness and the electric conductivity demanded and is, for example, preferably about from 0.1 to 2 $\mu$m.

The high refractive index layer is obtained by coating a transparent hard coat agent for a high refractive index on the first layer, followed by curing. The ultraviolet ray-curable transparent hard coat agent for a high refractive index contains, for example, high refractive index fine particles, such as a metal or a metal oxide, and a binder resin as a solid content. The ratio of the high refractive index metallic oxide and the binder resin is preferably high in proportion of the high refractive index metallic oxide, and from the standpoint of the film property of the composition and the scratch resistance of the film, the ratio of high refractive index metal oxide/binder is preferably from 80/20 to 50/50 (weight ratio).

Examples of the fine particles having a high refractive index include ZnO (refractive index: 1.90), $TiO_2$ (refractive index: 2.3 to 2.7), $CeO_2$ (refractive index: 1.95), $Sb_2O_5$ (refractive index: 1.7), ITO (refractive index: 1.95), $Y_2O_3$ (refractive index: 1.87), $La_2O_3$ (refractive index: 1.95), $ZnO_2$ (refractive index: 2.05), $Al_2O_3$ (refractive index: 1.63) and the like, and zirconium oxide, titanium oxide, cerium oxide, zinc oxide, indium oxide and a three-component sol of titanium oxide, zirconium oxide and tin oxide are preferred. In order that the film has transparency, the particle diameter of the high refractive index metallic oxide is generally 0.5 $\mu$m or less, and preferably 0.1 $\mu$m or less.

As the binder resin for the high refractive index layer, for example, a thermosetting resin or an ultraviolet ray-curable resin containing a molecule or an atom contributing to improvement of the refractive index and having a high refractive index is used alone or in combination. However, in order to improve the hardness of the high refractive index resin, an ultraviolet ray-curable resin is preferred. Examples of the molecule or the atom contributing to improvement of the refractive index include an aromatic ring, a halogen atom except F, and an atom of S, N, P and the like.

Examples of the ultraviolet ray-curable resin binder for the higher refractive index layer include an ultraviolet ray-curable polyfunctional acrylate having two or more (meth)acryloyl groups in the molecule thereof. Examples of the ultraviolet ray-curable polyfunctional acrylate having two or more (meth)acryloyl groups in the molecule thereof include a polyol polyacrylate, such as neoppentyl glycol di(meth)acrylate, 1,6-hexanediol di(meth)acrylate, trimethylolpropane tri(meth)acrylate, ditrimethylolpropane tetra(meth)acrylate, pentaerythritol tetra(meth)acrylate, pentaerythritol tri(meth)acrylate, dipentaerythritol hexa(meth)acrylate and the like, an epoxy (meth)acrylate, such as diacrylate of bisphenol A glycidyl ether, diacrylate of neopentyl glycol diglycidyl ether, di(meth)acrylate of 1,6-hexanediol diglycidyl ether and the like, a polyester (meth)acrylate obtained by esterification of a polyvalent carboxylic acid and/or an anhydride thereof, and acrylic acid with a polyvalent alcohol, a urethane acrylate obtained by reaction of a polyvalent alcohol, a polyvalent isocyanate and an acrylate containing a hydroxyl group, polysiloxane acrylate, and the like. The polymerizable acrylates mentioned above may be used singly or as a mixture of two or more of them.

The transparent hard coating agent for a high refractive index used in the invention may contain a high refractive index thermoplastic polymer. Examples of the high refractive index thermoplastic polymer include a polyester resin, an epoxy resin, an acrylic resin, a urethane resin and the like other than described in the foregoing.

In the invention, in order to impart an antiglare property to the resulting transparent sheet or film, fine unevenness may be made on the surface, facing the first layer, of the hard coating layer of the ultraviolet ray-curable (meth)acrylate resin made between the transparent support and the first layer or may be made on the surface facing the second layer of the transparent cured film layer of the ultraviolet ray-curable transparent hard coating agent of a high refractive index. In order to provide the fine unevenness, organic or inorganic fine particles (average particle diameter: 0.5 to 20 $\mu$m, by a light scattering method), such as silica, acrylic beads, silicone beads, benzoguanamine, urethane beads and the like, may be added to the hard coat layer or the transparent cured film layer in an amount of from 5 to 30% by weight against the resin component.

The transparent hard coating agent for a high refractive index used in the invention can be obtained by dispersing or dissolving a binder resin for the high refractive index layer, high refractive index fine particles, depending on necessity a polymerization initiator, an auxiliary, such as antiglare agent, other resins and the like in a suitable solvent. The ratio of the solvent and the solid components except the solvent is not limited as far as it is such a concentration that the coating agent can be coated, and in general, the proportion of the solid components is about from 10 to 95% by weight, and preferably about from 30 to 50% by weight, based on the total weight of the coating agent, and the balance is controlled by the solvent.

In order to improve the adhesion strength, a polymer may further be added to the coating agents for the respective layers. Examples of the polymer include an acrylic resin, a polyester resin, a butyral resin and the like other than those described in the foregoing. The adhesion strength herein means the adhesion strength to the support with respect to the electroconductive coating agent for the first layer, and the adhesion strength to the electroconductive resin layer of the first layer and the low refractive index coating layer of the second layer with respect to the high refractive index transparent hard coat agent for the high refractive index layer.

A photopolymerization initiator is generally added to the electroconductive coating agent, the transparent hard coat agent for a high refractive index and the low refractive index ultraviolet ray-curable coating agent. The photopolymerization initiator is not particularly limited, and various photopolymerization initiators can be used. Examples thereof include Irgacure 184 or Irgacure 651 (produced by Ciba Geigy Ltd.), Darocure 1173 (produced by Merck & Co.), benzophenone, methyl benzoylbenzoate, p-dimethylamino benzoate, thioxanthone and the like. The content thereof is preferably from 1 to 20% by weight based on the solid content of the composition.

An organic solvent may be additionally added to the respective coating agents. Examples of the organic solvent include an aromatic hydrocarbon, such as toluene, xylene and the like, a ketone, such as methyl ethyl ketone and the like, an ester, such as ethyl acetate and the like, an alcohol, such as methanol, ethanol and the like, and so on.

In order to produce the transparent sheet or film of the invention, for example, an electroconductive resin composition is coated on a support film by a coater, such as a gravure coater, a reverse coater, a microreverse coater and the like, and after drying, it is cured by irradiating with an ultraviolet ray, so as to form a cured film. The second layer can be formed on the first layer in the similar manner. In the case where a high refractive index hard coat layer is made, the higher refractive index hard coat layer is made on the first layer in the similar manner, and the second layer is formed on the higher refractive index hard coat layer. An ordinary hard coat layer may be made between the support and the first layer to further increase the surface hardness. In order to impart an antiglare property to the hard coat layer, organic or inorganic fine particles, such as silica, acrylic beads, silicone beads, benzoguanamine, urethane beads and the like, may be added to form fine unevenness on the surface thereof.

In the case of coating the coating agent, the coating agent may be used after appropriate dilution.

The transparent sheet or film of the invention is arranged on a display surface of a display device, such as LCD, CRT (cathode ray tube), a PDP and the like, or used in an electronic-related materials, such as a storage container of a semiconductor wafer, a construction member, such as a floor material, carpet, a wall material and the like, and so on. In this case, an adhesive agent layer, preferably a pressure-sensitive adhesive agent layer, is generally made on a back surface (the surface opposite to the surface, on which the first layer and the second layer are made) of the antistatic reflection preventing transparent sheet or film of the invention, and it is attached on the surface of a display device and the surface of the others through the adhesive agent layer. The adhesive agent used herein is preferably an acrylic ester adhesive agent. The adhesive agent may be colored, if necessary. From the standpoint of durability, the coloring is conducted with a pigment rather than a dye. While the pigment may be an inorganic pigment or an organic pigment, it is preferably in the form of fine particles and the haze of the adhesive agent colored with the pigment is preferably 3.0 or less from the standpoint of maintenance of the transparency. This is because sharpness of an picture can be maintained when the film is applied to a CRT. The reason why the coloring is conducted with a pigment is that while adjustment of brightness and adjustment of color tone are conducted by coloring glass in a CRT and a PDP, the control of brightness and the control of color tone can be conveniently conducted by coloring the adhesive agent, so as to reduce the cost. The addition amount of the pigment varies depending on the required transmittance and color tone.

EXAMPLES

The invention will be specifically described with reference to the Production Examples of Coating Agents and Examples. The parts show parts by weight unless otherwise indicated.

PRODUCTION EXAMPLES OF COATING AGENTS (1) Production of Electroconductive Coating Agent for First Layer (1-1) 3.5 Parts of Solsperse 20000 (a trade name, produced by Zeneca Agrochemicals, Co., Ltd., a cationic dispersant) as a dispersant is added to 100 parts of a methanol sol of zinc antimonate (a trade name, Celnax CX-Z600M-3, solid content: 60%, produced by Nissan Chemical Industries, Ltd.) under stirring, and 50 parts of an ultraviolet ray-curable resin composition (A), which is formed by mixing 64 parts of dipentaerythritol hexaacrylate (a trade name, KAYARAD DPHA, produced by Nippon Kayaku Co., Ltd.), 5.5 parts of a photoinitiator, Irgacure 184 (produced by Ciba Geigy Ltd.) and 30 parts of toluene, is further added, followed by further adding 35 parts of MEK as a diluting solvent and 0.02 part of silicone series slipping agent SF-8421 (a trade name, produced by Toray Dow Corning Silicone Co., Ltd.), so as to obtain an ultraviolet ray-curable electroconductive coating agent (11).

(1-2) 2 Parts of Solsperse 20000 (a dispersant, produced by Zeneca Agrochemicals, Co., Ltd.) and 32 parts of MEK are added to 100 parts of Celnax CX-Z600M-3F2 (a methanol sol of zinc antimonate, solid content: 60%, produced by Nissan Chemical Industries, Ltd.) under stirring, and 25 parts of the ultraviolet ray-curable resin composition (A) is further added thereto as a binder, followed by sufficiently stirring, so as to obtain an electroconductive high refractive index hard coat agent (12).

(2) Production of Hard Coating Agent for High Refractive Index Layer (1) 3 Part of Solsperse 20000 (a trade name) as a dispersant and 0.5 part of Irgacure 369 (a trade name) are added to 100 parts of a methanol sol of three components, $TiO_2$-$SnO_2$-$ZrO_2$ (solid content: 30%) (a trade name, HIT-30M, produced by Nissan Chemical Industries, Ltd.) under stirring, and 14.3 parts of an ultraviolet ray-curable resin (B), which is formed by mixing 63.6 parts of DPHA (produced by Nippon Kayaku Co., Ltd.) as an ultraviolet ray-curable resin having six acrylate groups, photoinitiators, 6.4 parts-of Irgacure 184 (a trade name) and 1.8 parts of Irgacure 369 (a trade name), and 30 parts of toluene, is further added, followed by sufficiently stirring, so as to obtain an ultraviolet ray-curable high refractive index hard coating agent (1).

(2) An ultraviolet ray-curable high refractive index hard coat agent (2) is obtained in the same manner as (1) except that the addition amount of the ultraviolet ray-curable resin (B) is 28.6 parts.

(3) Production of Low Refractive Index Coating Agent for Second Layer (a) 100 Parts of a silicone series ultraviolet ray-curable resin (produced by Shin-Etsu Chemical Co., Ltd.) and 3 parts of a photoinitiator, Irgacure 184 (a trade name) are added to 300 parts of an MEK solution of silica sol having an average particle diameter of 30 nm (solid content: 30%) (produced by Nissan Chemical Industries, Ltd.) under stirring, so as to obtain a low refractive index ultraviolet ray-curable resin composition (a).

(b) 100 Parts of the ultraviolet ray-curable resin (A), 133 parts of methyl ethyl ketone and 233 parts of MEK-ST (a trade name, an MEK solution of silica sol, solid content: 30%, produced by Nissan Chemical Industries, Co., Ltd.) are mixed and sufficiently stirred to obtain an ultraviolet ray-curable resin (C). Furthermore, 80 parts of the ultraviolet ray-curable resin composition (a) and 20 parts of the ultraviolet ray-curable resin (C) are mixed and sufficiently stirred to obtain a low refractive index ultraviolet ray-curable resin composition (b).

(4) Production of Ultraviolet Ray-Curable Hard Coating Agent used between Support and First Layer 30 Parts of Vylon 24SS (a polymer solution of a solid content of 30%, Toyobo Co., Ltd.), 5.5 parts of Irgacure 184 (a photoinitiator, produced by Ciba Geigy Ltd.) and 34 parts of toluene are added to 64 parts of KAYARAD DPHA (dipentaerythritol hexaacrylate produced by Nippon Kayaku Co., Ltd.) to obtain an ultraviolet ray-curable hard coating agent (41).

Examples 1 to 9

The ultraviolet ray-curable electroconductive coating agent (1) is coated on a polyester film of 188 microns (A4300 produced by Toyobo Co., Ltd.) to a film thickness of 3 μm to provide the first layer. The high refractive index hard coat agent (1) or (2) is coated on the first layer to obtain a high refractive index hard coated film. A dispersion obtained diluting the low refractive index resin composition (a) or (b) with methyl ethyl ketone to the concentrations shown in Table 1 below is further coated thereon to provide the second layer, so as to obtain an electroconductive low reflection film. In Table 1, the hard coat layer is made between the support and the first layer. The expressions (1) and (2) in the column of "high refractive index layer" in Table 1 show the hard coating agent (1) and (2), respectively, the expression "a" and "b" in the column of "second layer" in Table 1 show the low refractive index resin compositions (a) and (b), respectively, and the subsequent numeral values show the content (% by weight) of the solid content after dilution.

Furthermore, on the opposite surface to the low reflective layer, an adhesive agent, which is obtained by mixing 100 g of a solvent type adhesive agent (solid content: 28%) (a trade name PTR-2500T, produced by Nippon Kayaku Co., Ltd.), 0.3 g of a cross-linking agent L-45 (a trade name, produced by Nippon Kayaku Co., Ltd.) and coloring agents, 0.767 g of CAB-LX-905-Black, 0.333 g of CAB-LX-716-Blue and 0.307 g of CAB-LX-471-Red, is coated in such a manner that the film thickness after drying is 17 microns, and the visible ray transmittance after drying is about 60%, so as to obtain electroconductive (antistatic) reflection preventing films having a colored adhesive.

The electroconductive reflection preventing films were subjected to various examinations. The results are shown in Table 1. The total luminous transmittance and the haze were examined by using the films before providing the colored adhesive layer.

TABLE 1

| Example | Hard coat layer | First layer | High refractive index layer | Second layer (%) | Pencil hardness | Scratch resistance | Surface resistivity (Ω per square) ($\times 10^8$) | Reflectivity (%) | Total luminous transmittance (%) | Haze |
|---|---|---|---|---|---|---|---|---|---|---|
| 1 | — | 11 | (1) | a 15 | 2H | A | 1.9 | 3.83 | 87.8 | 1.5 |
| 2 | — | 11 | (1) | a 7 | 2H | A | 2.0 | 2.09 | 89.2 | 1.3 |
| 3 | — | 11 | (1) | a 3 | 2H | A | 1.5 | 4.33 | 87.6 | 1.3 |
| 4 | — | 11 | (1) | a 7 | 2H | A | 2.1 | 2.06 | 87.2 | 1.4 |
| 5 | — | 11 | (2) | a 15 | 2H | A | 2.0 | 1.93 | 88.1 | 1.0 |
| 6 | — | 11 | (1) | b 7 | 2H | A | 1.7 | 1.39 | 89.9 | 1.5 |
| 7 | — | 11 | — | a 15 | 2H | A | 1.6 | 4.03 | 89.0 | 1.8 |
| 8 | — | 12 | — | a 7 | 2H | A | 0.5 | 1.4 | 89.3 | 0.7 |
| 9 | 41 | 12 | — | a 7 | 3H | A | 8 | 1.4 | 90.1 | 0.5 |

Pencil hardness: Measured according to JIS K5400 (A pencil is attached to a sample at an angle of 45°, and scratched on the surface under a load of 1 Kg, so as to obtain a pencil hardness that does not form a flaw.)

Scratch resistance: Rubbing is conducted using steel wool #0000 under a load of 200g/cm² 20 times, and the damage on the surface was observed visually.
A: Very good
B: Good
C: Slightly poor
D: Poor Surface resistivity: Measured with a surface resistivity measuring apparatus (Megaresta produced by Shishido Static Electricity, Co., Ltd.)

Reflectivity: Reflectivity (%) at a wavelength of 550 nm

Total luminous transmittance and haze: Measured with a haze meter, TC-H3DPK of Tokyo Denshoku Co., Ltd.)

Example 10

2 Parts of Solsperse 20000 (a dispersant, produced by Zeneca Agrochemicals, Co., Ltd.) and 38 parts of MEK are added to 100 parts of Celnax CX-Z650M-3F (a methanol sol of zinc antimonate, solid content: 60%, produced by Nissan Chemical Industries, Ltd.), and 40 parts of an ultraviolet ray-curable resin composition (A), which is obtained by mixing ultraviolet ray-curable resins as a binder, 51.6 parts of KAYARAD DPHA (dipentaerythritol hexaacrylate, produced by Nippon Kayaku Co., Ltd.) and 12.9 parts of KAYARAD PET-30 (pentaerythritol triacrylate, produced by Nippon Kayaku Co., Ltd.), 5.5 parts of Irgacure 184 (a photopolymerization initiator, produced by Ciba Geigy Ltd.) and 30 parts of toluene, is further added thereto, followed by sufficiently stirring, so as to obtain an antistatic high refractive index hard coating agent (3).

Example 11

2 Parts of Solsperse 20000 (a dispersant, produced by Zeneca Agrochemicals, Co., Ltd.) and 32 parts of MEK are added to 100 parts of Celnax CX-Z650M-3F (a methanol sol of zinc antimonate, solid content: 60%, produced by Nissan Chemical Industries, Ltd.), and 25 parts of an ultraviolet ray-curable resin composition (B), which is obtained by mixing 64.5 parts of an ultraviolet ray-curable resin, KAYARAD DPHA (dipentaerythritol hexaacrylate, produced by Nippon Kayaku Co., Ltd.), Irgacure 184 (a photopolymerization initiator, produced by Ciba Geigy Ltd.) and 30 parts of toluene, is further added thereto, followed by sufficiently stirring, so as to obtain an antistatic high refractive index hard coating agent (4).

Example 12

An antistatic high refractive index hard coating agent (5) is obtained in the same manner as in Example 11 except that the methanol sol of zinc antimonate is Celnax CX-Z600M-3F2 produced by Nissan Chemical Industries, Ltd.

The compositions of Examples 10 to 12 (antistatic high refractive index hard coating agents (3) to (5)) were coated on a polyester film of 188 μm (A4300 produced by Toyobo Co., Ltd.) by using a coating rod at a film thickness of 1 μm, followed by irradiating with an ultraviolet ray, so as to provide cured films, and measurements for total luminous transmittance, haze, pencil hardness, scratch resistance and solvent resistance are conducted. They are coated on glass using a coating rod to a film thickness of 1 μm, followed by irradiating with an ultraviolet ray, so as to provide cured films, and the refractive indexes of the cured films of the respective compositions are measured by the measurements of the refractive index at 550 nm.

TABLE 2

| Example | Total luminous transmittance (%) | Haze | Pencil Hardness | Scratch resistance | Solvent resistance | Refractive index | Surface resistivity Ω per square |
|---|---|---|---|---|---|---|---|
| 10 | 83.7 | 1.0 | 2H | A | A | 1.595 | $3 \times 10^7$ |
| 11 | 83.0 | 1.0 | 2H | A | A | 1.617 | $1 \times 10^7$ |
| 12 | 85.2 | 0.9 | 2H | A | A | 1.616 | $1 \times 10^7$ |

Note) Test Methods
Total luminous transmittance and haze: Measured with a haze meter, TC-H3DPK of Tokyo Denshoku Co., Ltd.)
Pencil hardness: Measured according to JIS K5400 in the similar manner above
Scratch resistance: Rubbing is conducted using steel wool #0000 under a load of 200g/cm² 20 times, and the damage on the surface was observed visually.
A: Good
B: Slightly poor
C: Poor
Solvent resistance: Rubbing is conducted with MEK 20 times, and the conditions of the coated film were observed.
A: Good
B: Slightly poor
C: Poor
Refractive index: Measured with Abbe's refractometer
Surface resistivity: Measured with a surface resistivity measuring apparatus, Megaresta produced by Shishido Static Electricity, Co., Ltd.

INDUSTRIAL APPLICABILITY

The transparent sheet or film of the present invention is good in productivity, high in transparency, excellent in antistatic property and reflection preventing property, high in hardness, and excellent in scratch resistance and solvent resistance, and therefore, for improvement in protection and/or viewing of picture in display and polarizing plates and a surface of various plastics or glass, it can be conveniently applied to the surfaces thereof.

What is claimed is:
1. A transparent resin sheet or film having on one surface of a transparent support, a first electroconductive transparent layer having a refractive index of 1.55 or higher and comprising a cured layer of an ultraviolet ray-curable (meth) acrylate resin having two or more (meth) acryloyl groups in a molecule thereof and containing fine particles of electroconductive zinc antimonate anhydride having a primary particle diameter of 0.5 microns or less in an amount of from 55 to 90% by weight based on the total weight of the first electroconductive transparent layer, and a second transparent resin layer having a refractive index of 1.5 or less and being formed on the first layer, and the surface reflectivity of said transparent sheet or film is 4% or less at 550 nm of wavelength.
2. A transparent sheet or film as described in claim 1, wherein the first electroconductive transparent layer contains a dispersant.
3. A transparent sheet or film as described in claim 1 or 2, wherein said fine particles are zinc antimonate having a particle diameter, by a BET method, of 18 nm or less and an average particle diameter, by a dynamic light scattering method, of 100 nm or less.
4. A transparent sheet or film as described in any one of claims 1 or 2, wherein the second transparent layer contains a surface active agent.
5. A transparent sheet or film as described in any one of claims 1 or 2, wherein the second transparent layer has a refractive index of 1.48 or less.
6. A transparent sheet or film as described in any one of claims 1 or 2, which has a hard coated layer comprising an ultraviolet ray-curable (meth)acrylate resin having two or more (meth)acryloyl groups in a molecule thereof, between the transparent support and the first layer.
7. A transparent sheet or film as described in claim 6, characterized that the transparent sheet or film has a hard coated layer formed between said transparent support and said first layer, and wherein said transparent sheet has fine unevenness on the surface, facing the first layer, of said hard coated layer, said hard coated layer being made from said ultraviolet ray-curable (meth)acrylate resin.
8. A transparent sheet or film as described in any one of claims 1 or 2, which has a transparent layer comprising an ultraviolet ray-curable transparent hard coating agent and having a refractive index higher than that of the first layer between the first layer and the second layer.
9. A transparent sheet or film as described in claim 8, characterized that the transparent sheet or film has a hard coated layer formed between said first layer and said second layer, and wherein said hard coated layer has fine unevenness on the surface, facing said second layer.
10. A transparent sheet or film as described in claim 8, wherein said ultraviolet ray-curable transparent hard coating agent of a high refractive index comprises an ultraviolet ray-curable binder containing an ultraviolet ray-curable resin having two or more (meth)acryloyl groups in a mol- ecule thereof, and fine particles of a high refractive index comprising a metal or a metallic oxide; and said transparent layer comprising said transparent hard coating agent has a refractive index of 1.55 or higher.

11. A transparent sheet or film as described in claim 10, wherein the fine particles of a high refractive index are zirconium oxide, titanium oxide, cerium oxide, zinc oxide, indium oxide or a three-component sol of titanium oxide, zirconium oxide and tin oxide, and have an average particle diameter of 0.5 µm or less.

12. A transparent sheet or film as described in claim 1, which has an adhesive agent layer on the other surface of the transparent support.

13. A transparent sheet or film as described in claim 12, wherein the adhesive agent is colored by a coloring agent.

14. A transparent sheet or film as described in claim 13, wherein the coloring agent is a pigment.

15. A transparent sheet or film which comprises a transparent support having, on one surface of said transparent support, a hard coating layer of an ultraviolet ray-curable (meth)acrylate resin having two or more (meth)acryloyl groups in a molecule thereof, and a first electroconductive transparent resin layer formed on the hard coating layer and comprising a cured resin layer and particles of electroconductive zinc antimonate anhydride being formed thereon, and a second transparent resin layer being formed on the first electroconductive transparent layer wherein the refractive index of said second transparent resin layer is lower than that of the first layer, and wherein the fine particles of zinc antimonate are zinc antimonate having a particle diameter, by a BET method, of 18 nm or less and an average particle diameter, by a dynamic light scattering method, of 100 nm or less and wherein said resin of the first resin layer comprises an ultraviolet ray-curable (meth)acrylate having two or more (meth)acryloyl groups in a molecule thereof and the amount of the electroconductive zinc antimonate anhydride is from 55 to 90% by weight and having a haze of 1.5 or less and a reflectivity of 2% or less.

16. A display device on which a transparent sheet or film as described in claim 15 is attached.

* * * * *